Patented Aug. 14, 1945

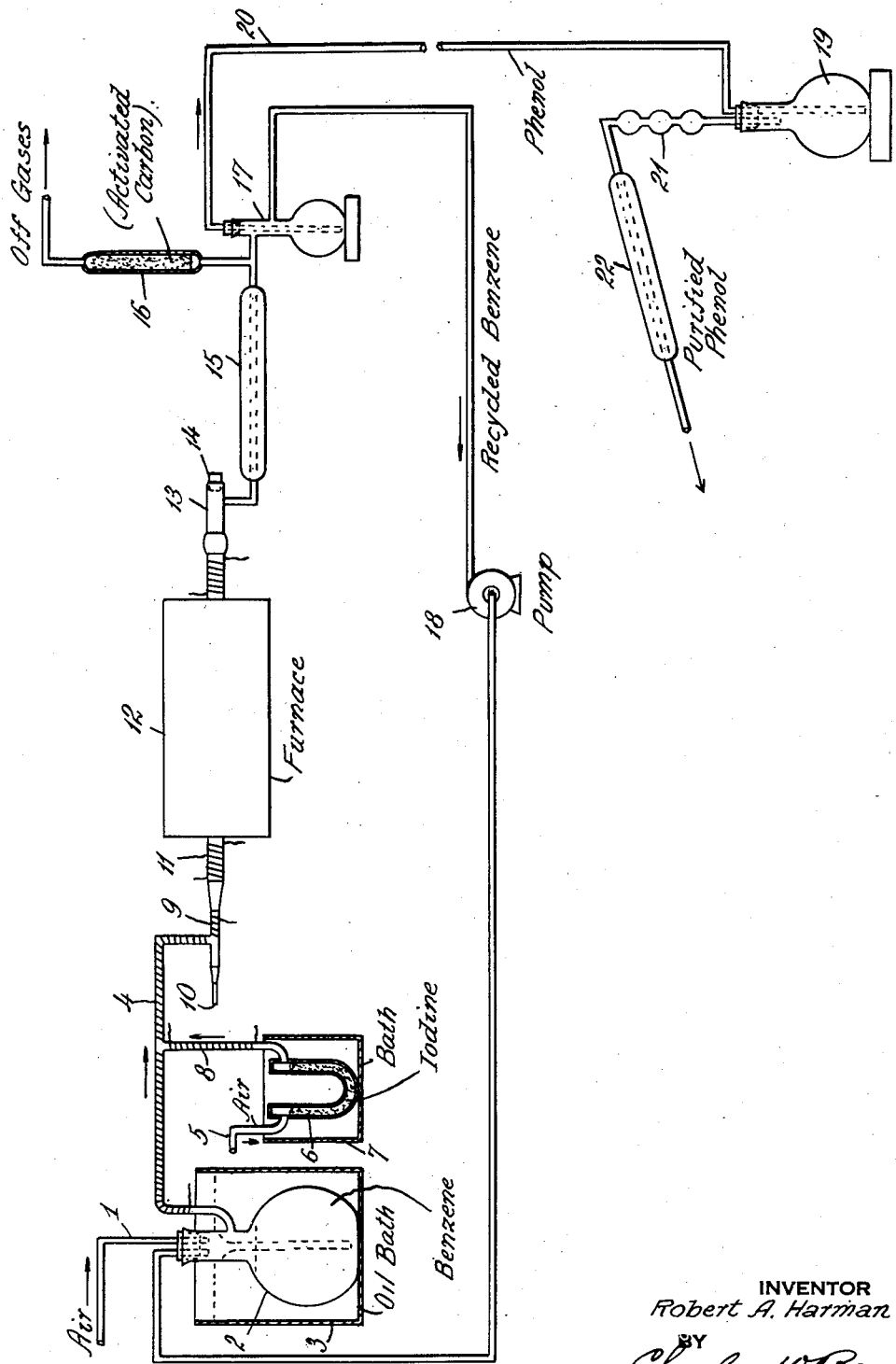

2,382,148

UNITED STATES PATENT OFFICE 2,382,148

OXIDATION OF AROMATIC COMPOUNDS

Robert A. Harman, Plainfield, N. J., assignor to The Solvay Process Company, New York, N. Y., a corporation of New York Application October 15, 1942, Serial No. 462,114

9 Claims. (Cl. 260—621)

My invention relates to the oxidation of aromatic compounds in the vapor phase without loss of carbon from the compound, and particularly to the oxidation of aromatic hydrocarbons to phenols, e. g., benzene to phenol.

The production of synthetic phenol by direct oxidation of benzene long has been recognized as a desirable objective since such process, if successfully accomplished, is much simpler than other processes for synthesizing phenol which proceed by way of intermediates such as benzene sulfonate or chlorbenzene and which not only require large quantities of reagents such as sulfuric acid, chlorine, caustic soda, etc., but involve complicated processing operations. By contrast, the direct oxidation of benzene in vapor phase with air requires no reagents other than the benzene and air and the operation is simpler than conventional processes.

The obstacle to the direct oxidation of benzene to phenol is that the operation is difficult to control so as to result in the production of commercial yields of phenol. At the high temperatures necessarily employed to induce the oxidation there is a strong tendency for the oxidation to proceed beyond the partial oxidation stage represented by phenol, at which stage one atom of oxygen has attached itself to the benzene ring without rupture of the ring or loss of carbon atoms from the molecule. In other words, the benzene, and whatever phenol is formed, at the temperature required to initiate air oxidation of benzene tend to oxidize completely to water and $CO_2$ or some undesired intermediate oxidation product.

Attempts have been made to discover a catalyst suitable for controlling the reaction, with but little success. Thus, Weiss and Downs, Industrial & Engineering Chemistry, vol. 12, (1920) pages 288-32, in an attempt to find a practical catalytic process for oxidizing benzene to phenol with air tried "every metal and metal oxide which would be stable under the conditions of the experiment . . . and in addition many mixtures. Whenever a trace of product was formed, we went thoroughly into the various combinations with that particular catalyst in attempts to enlarge the observations to commercial possibilities. In no case did we secure yields of phenol at all approaching anything commercial, although in the case of a few catalysts we obtained conversions of from 0.2 to 0.3%." The authors did, however, produce some benzoquinone and and found that with certain catalysts there was formation of maleic anhydride.

United States Patent 2,223,383 of December 3, 1940 to W. W. Moyer and W. C. Klingelhoefer discloses that by suitably correlating the various reaction conditions (temperature, time of reaction, pressure, and ratio of oxygen to hydrocarbon) and by employing a reaction zone devoid of catalytic contact masses commercially satisfactory yields of phenol (from benzene) and cresol (from toluene) are obtained.

I have now discovered that gaseous iodine has a directive effect on the vapor phase oxidation of benzene and brings about substantially improved yields of phenol. The present invention has as an object, therefore, improving the yield of monohydroxy nuclear substitution products, e. g. phenols, obtainable in the vapor phase oxidation of aromatic compounds, particularly aromatic hydrocarbons, e. g. benzene.

In accordance with my invention the vapor of the aromatic compound is mixed with an oxygen-containing gas and the oxidation is conducted in the presence of iodine vapor. In the presence of the iodine vapor the reaction temperature necessary to bring about a given percentage attack on the benzene (a given proportion of benzene molecules reacting with the oxygen) is substantially lowered. In other respects the reaction conditions for a homogeneous gas phase reaction of the benzene vapors and oxygen may be as disclosed in the above U. S. Patent 2,223,383. For example, by passing a stream of oxygen-containing gas through a benzene container maintained at the appropriate temperature, benzene vapor and oxygen may be intermixed in a volume ratio of benzene to oxygen from about 1.25 to about 50, preferably a ratio from about 3.3 to 10 (corresponding to a benzene-air ratio of about .67 to about 2). To the mixed vapors gaseous iodine is added suitably in amounts from about 0.005 to about 0.5 per cent by volume of the benzene vapor. Preferred amounts are about 0.01 to 0.1 per cent. Larger amounts of iodine, for example up to 10% or more, may be added, if desired, but are not necessary to obtain the advantages of my invention. The iodine may be introduced by maintaining solid iodine or a benzene solution of iodine at a temperature which will produce the desired vapor pressure of the iodine. A measured stream of air may be passed through the solid substance or the solution. The desired amount of iodine may thus be vaporized and the vapors introduced into the primary mixture of benzene and oxygen-containing gas.

The mixed vapors, heated to prevent condensation, are passed into a reaction zone in which is maintained a temperature sufficient to produce about 1 to 20% (preferably 3 to 12%) attack on the benzene by the oxygen. By "1 to 20% attack" is meant that 1 to 20% of the benzene molecules present react with oxygen; the remaining benzene molecules pass through the reaction zone unattacked by the oxygen though some may interact to form normally liquid hydrocarbons. The optimum temperature depends upon such factors as dimensions of the reaction vessel, time of contact, pressure, proportion of benzene to oxygen, amount of added iodine, etc., but will lie within the range of about 325° to 800° C.; the preferred range is from about 450° to about 750° C.

The reaction time (time during which the gas mixture is exposed to the above reaction temperatures) will vary with the reaction temperature and other conditions and in general will be from about $\frac{1}{10}$ second to about 4 minutes. The reaction zone is preferably devoid of catalytic contact masses so that the reaction takes place as a homogeneous gas phase reaction. For this type of reaction the ratio of free space to wall area preferably is relatively large and no less than that existing in a 1 inch diameter unobstructed reaction tube. However, catalytic contact masses are not necessarily absent from the reaction zone.

Suitable space velocities in the reaction zone may be anywhere from about 50 up to several thousand (calculated on the basis of total gas volume at S. T. P. per hour per volume of space in the reaction zone), depending on the conditions of temperature, pressure, and contact time selected. Space velocities under preferred conditions lie within the range of about 100 to about 2,000. The pressure is suitably atmospheric, but may be higher or lower, if desired.

The following specific example will illustrate the practice of my invention, but inasmuch as certain changes may be made without departing from the scope of the invention the example is to be interpreted as illustrative and not in a limiting sense.

Apparatus suitable for carrying out the process of my invention is shown in the accompanying drawing. In the drawing, 1 is an inlet line for air and 2 is a vessel placed in the thermostatically regulated oil bath 3. 4 is the exit line from the vessel, wound with Nichrome wire for heating as shown. 5 is a second inlet line for air leading into the U-tube 6 adapted to contain solid iodine and placed in the constant temperature bath 7. 8 is the exit line from the U-tube. 9 is a Pyrex glass T through which the thermocouple well 10 passes into the reaction tube 11, the exposed portions of which are also wound with Nichrome. The connections are suitably made with rubber collars. The reaction tube is heated by the electric furnace 12. 13 is a T connected to the reaction tube, in which a removable plug 14 is placed. The plug may be removed to allow taking balloon samples of the products. 15 is a condenser, 16 is a tube of active carbon for recovering benzene from the off gases, 17 is a still and 18 a pump for recirculating unreacted benzene and any iodine accompanying this benzene to the vessel 2. 19 is a still for fractionally distilling a liquid containing phenol drawn (by means of a pump or other means not shown in the drawing) from still 17 through tube 20. Still 19 is provided with a rectifier 21 and condenser 22.

In operation, the vessel 2 is filled with benzene, and air, metered through a capillary flow meter, is passed through line 1 into vessel 2. The oil bath 3 is maintained suitably at a temperature of 60° C. The vapor pressure of the benzene in flask 2 is then such as to produce about a 1:1 mixture by volume of benzene with the entering air. The mixed air and benzene vapors pass out by line 4, which is maintained above 60° C. by the Nichrome wire coil to prevent condensation of the benzene vapor.

A secondary metered stream of air is introduced through line 5 into U-tube 6 containing solid iodine. Or, if desired, a vaporizer containing a suitable solution of iodine in benzene may be substituted for tube 6; it would be maintained at about 60° C. and the primary benzene-air mixture would be passed through it directly. Tube 6 is maintained by the bath 7 at the temperature required to provide the desired volume ratio of gaseous iodine to benzene in the final mixture of air, benzene vapor, and iodine vapor. For example, the tube may be maintained at 100° C. and about $\frac{1}{100}$ of the total air may be passed through it. The final mixture will then contain about 0.1% of iodine vapor by volume of the benzene vapor. Iodine vapor and air leave the U-tube by line 8 and join the benzene-air mixture in line 4. The mixed gases then pass through the T 9 into the combustion tube 11 where part of the benzene reacts with the formation of normally gaseous oxidation products (such as carbon oxides), phenol, diphenyl and other products. Normally liquid reaction products (benzene, phenol, diphenyl, and others) are condensed in the condenser 15; benzene is recovered from the off gases by the activated carbon tube 16. Unreacted benzene is separated from higher boiling liquids in still 17 and is recirculated along with any accompanying iodine by pump 18 to the benzene vaporizer 2, while phenol and other liquid products are collected as a still residue which is drawn off to still 19. In still 19 with its rectification column 21 the liquid containing phenol is fractionally distilled to take off from condenser 22 a purified phenol separate from the lower and higher boiling materials in the liquid residue collected in still 17.

The following specific example will illustrate the invention:

In apparatus as shown in the figure in which the reaction tube 11 was of Pyrex glass 1½ inches inside diameter, with a maximum temperature of 604° C. and contact time about 9 seconds (corresponding to a space velocity of 128), the following results were obtained:

Air/benzene mol ratio = 1
Per cent of gaseous iodine by volume of benzene vapor = about 0.02
Per cent benzene reacted to gaseous and liquid products = 4.79
Yield of phenol on reacted benzene = 56.5% (68.2 lbs. per 100 lbs. reacted benzene)

It is found that much of the iodine employed as catalyst is recovered with the unreacted benzene and may be recycled with the benzene in the process.

Under similar conditions but without iodine a temperature about 50° C. higher than that used with iodine was required to produce approximately the same attack on the benzene. In a recirculation experiment under conditions comparable to those above, in which the benzene reacted was 4.15%, the yield of phenol on reacted benzene without iodine was 40.4%.

Iodine especially increases the amount of benzene going to phenol as against benzene going to waste gases and lowers the reaction temperature for a given attack of the benzene by the oxygen. The beneficial effect of iodine on the reaction is particularly marked when the free space in the reaction zone is large compared to the surface.

In tubes smaller than 1 inch inside diameter, for example in ½ inch tubes, the effect of iodine on the reaction temperature largely disappears (although iodine continues to show a favorable effect on phenol production). With 0.1% of iodine vapor instead of 0.02% by volume of the benzene vapor, the temperature producing a given attack in the large tubes is lowered by about 70° C. instead of 50° C. In other respects the results with 0.1% of iodine vapor are about the same or somewhat better than with 0.02% by volume of the benzene vapor. Accordingly, as pointed out above, a process in which the volume of the reaction zone is large as compared with the area of the surfaces bounding the zone constitutes a preferred embodiment of my invention.

In view of these facts I believe that iodine is not, like the conventional oxide oxidation catalyst, an oxygen carrier, but rather it appears iodine promotes a homogeneous gas phase "chain" reaction which produces phenol as one product. By chain reaction I mean a reaction in which a reactive intermediate, for example the free phenyl radical, is formed which intermediate reacts with the starting materials with the eventual formation of stable products and new representatives of the reactive species. The new reactive intermediates then repeat the operation thus carrying on the reaction "chain." However, my invention is not to be regarded as limited in scope by this or any other particular theory of its mechanism.

The fact that much of the iodine used as catalyst is recovered with the unreacted benzene shows that the iodine has little tendency to react with the phenol formed, and, therefore, that much larger quantities of iodine than mentioned above may be employed, if desired. However, large quantities are not necessary to obtain the advantageous effect of iodine as catalyst.

Although as indicated above I preferably use elementary gaseous iodine in my process, I may, of course, also use compounds of iodine which are decomposed to elementary iodine under the reaction conditions. Thus, for example, I may introduce into the reaction zone hydrogen iodide or an organic compound of iodine instead of the element itself.

My invention is not confined to the oxidation of benzene; it may be applied also to the oxidation of other compounds containing an aromatic nucleus, such as toluene and naphthalene and to the partially chlorinated aromatic hydrocarbons, such as chlorbenzene. In applying my invention to the oxidation of aromatic compounds other than benzene the reaction conditions outlined above as suitable for benzene will apply in general to the other compounds. Thus, the temperature, time of reaction, pressure, and ratio of oxygen to hydrocarbon will fall within the ranges given above as suitable for benzene and should be correlated to produce not more than 20% attack by oxygen on the compound passed through the reaction zone.

I claim:

1. In the vapor phase oxidation of benzene to phenol with an oxygen-containing gas, that improvement which comprises carrying out the oxidation in the presence of gaseous iodine.

2. In the homogeneous gas phase partial oxidation of benzene vapors with an oxygen-containing gas, that improvement which comprises carrying out the oxidation in the presence of gaseous iodine.

3. In the homogeneous gas phase oxidation of benzene to phenol with an oxygen-containing gas, that improvement which comprises carrying out the oxidation in the presence of not more than 10% of gaseous iodine by volume of the benzene vapor.

4. In the homogeneous gas phase oxidation of benzene to phenol with an oxygen-containing gas, that improvement which comprises reacting the benzene vapors with the oxygen-containing gas in the presence of from about 0.005 to about 0.5% of iodine vapor by volume of benzene vapor.

5. The process of producing phenol from benzene, which comprises passing at substantially atmospheric pressure a mixture of benzene vapor and air in a volume ratio of benzene to air from about 0.67 to about 2 through a reaction zone maintained at a temperature between about 450° C. and about 750° C. in the presence of about 0.01 to 0.1% of iodine vapor by volume of the benzene vapor, and so correlating the velocity and temperature at which said mixture passes through said reaction zone that about 3% to about 12% of the benzene is attacked by the oxygen during a single pass of the benzene through said reaction zone, separating unreacted benzene from reaction products, and recycling the unreacted benzene and accompanying iodine through the reaction zone.

6. The method of producing phenol from benzene, which comprises passing a gaseous mixture containing benzene vapor and oxygen in a volume ratio of benzene to oxygen within the range 1.25:1 to 50:1 through a reaction zone maintained at a temperature within the range 325° to 800° C. in the presence of iodine vapor amounting to no more than 10% by volume of the benzene vapor, said reaction zone being devoid of catalytic contact masses, and so correlating the velocity, temperature, and presence at which said mixture passes through said reaction zone that not more than 20% of the benzene is attacked by the oxygen during a single pass of the benzene through said reaction zone.

7. The process of producing phenol from benzene, which comprises passing at substantially atmospheric pressure a mixture of benzene vapor and air in a volume ratio of benzene to air from about 0.67 to about 2 through a reaction zone maintained at a temperature between about 450° C. and about 750° C. in the presence of about 0.01 to 0.1% of iodine vapor by volume of the benzene vapor, and so correlating the velocity and temperature at which said mixture passes through said reaction zone that about 3% to about 12% of the benzene is attacked by the oxygen during a single pass of the benzene through said reaction zone.

8. In the vapor phase oxidation of an aromatic hydrocarbon from the group consisting of benzene and toluene with an oxygen-containing gas to form a phenol, that improvement which comprises carrying out the oxidation in the presence of gaseous iodine.

9. In the homogeneous gas phase oxidation of an aromatic hydrocarbon from the group consisting of benzene and toluene with an oxygen-containing gas to form a phenol, that improvement which comprises carrying out the oxidation in the presence of gaseous iodine in amount not greater than 10% by volume of the aromatic hydrocarbon vapor.

ROBERT A. HARMAN.

CERTIFICATE OF CORRECTION.

Patent No. 2,382,148. August 14, 1945.

ROBERT A. HARMAN.

It is hereby certified that error appears in the printed specification of the above numbered patent requiring correction as follows: Page 1, first column, line 40, for "pages 288-32" read --pages 228-32--; page 3, second column, line 40, claim 6, for "presence" read --pressure--; and that the said Letters Patent should be read with this correction therein that the same may conform to the record of the case in the Patent Office.

Signed and sealed this 13th day of November, A. D. 1945.

Leslie Frazer

(Seal)  First Assistant Commissioner of Patents.